(12) United States Patent
Bernett et al.

(10) Patent No.: US 6,388,834 B1
(45) Date of Patent: May 14, 2002

(54) GROUNDING POST TO REDUCE EMI NOISE EFFECTS IN DISC DRIVES

(75) Inventors: Frank William Bernett, Longmont; Tom Michael Durrum, Broomfield, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/472,501

(22) Filed: Dec. 27, 1999

Related U.S. Application Data (60) Provisional application No. 60/132,991, filed on May 7, 1999.

(51) Int. Cl.[7] .......................... G11B 17/00; G11B 5/012; G11B 21/16; G11B 5/48
(52) U.S. Cl. ..................................... 360/97.01; 360/246
(58) Field of Search .......................... 260/97.01, 97.02, 260/88, 264.2, 245.8, 246, 245.9

(56) References Cited

U.S. PATENT DOCUMENTS

| | | | |
|---|---|---|---|
| 5,241,436 A | * 8/1993 | Kawabata et al. | 360/97.01 |
| 5,262,737 A | 11/1993 | Siverling | 333/12 |
| 5,270,887 A | * 12/1993 | Edwards et al. | 360/97.03 |
| 5,448,433 A | 9/1995 | Morehouse et al. | 360/97.02 |
| 5,684,775 A | * 11/1997 | Tanaka et al. | 369/75.1 |
| 5,761,031 A | 6/1998 | Ajmani | 361/685 |
| 5,841,606 A | * 11/1998 | Shimazu et al. | 360/99.01 |
| 5,969,901 A | * 10/1999 | Eckberg et al. | 360/97.01 |

* cited by examiner

*Primary Examiner*—William Klimowicz
*Assistant Examiner*—Julie Anne Watko
(74) *Attorney, Agent, or Firm*—John B. Phillips; Merchant & Gould P.C.

(57) ABSTRACT

An apparatus for reducing transmission of EMI noise effects originating within disc drives by including a grounding member positioned between at least a portion of a flex circuit and an EMI noise source. The grounding member makes electrically conductive contact with the cover and base plate of the disc drive and thereby provides an alternative pathway for EMI noise, as opposed to traveling along the actuator arm (E block). By reducing the transmission of EMI noise, the number of read errors from the disc is likewise minimized.

16 Claims, 8 Drawing Sheets

GROUNDING POST TO REDUCE EMI NOISE EFFECTS IN DISC DRIVES

RELATED APPLICATIONS

This application claims the benefit of priority of U.S. Provisional Patent Application Ser. No. 60/132,991 entitled "SUPPLEMENTAL GROUNDING POST TO REDUCE EMI NOISE EFFECTS", filed May 7, 1999.

FIELD OF THE INVENTION

This application relates generally to the field disc drive storage devices, and more particularly, to an apparatus for reducing transmission of EMI noise originating within a disc drive.

BACKGROUND OF THE INVENTION

Disc drives are data storage devices that store digital data in magnetic form on a rotating storage medium, such as a disc. Modern disc drives comprise one or more rigid discs that are coated with a magnetizable medium and mounted on the hub of a drive motor for rotation at a constant high speed. Information is stored on the discs in a plurality of concentric circular tracks typically by an array of transducers ("heads") mounted to a radial actuator arm (E-block) for movement of the heads relative to the discs. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment.

Typically, such actuators employ a voice coil motor to position the heads with respect to the disc surfaces. The actuator voice coil motor includes a coil mounted on the side of the actuator arm opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

The heads are mounted via flexures at the ends of a plurality of actuator arms that project radially outward from the actuator body. The actuator body pivots about a bearing assembly mounted on the base plate at a position closely adjacent to the outer extreme of the discs. The head(s) read data and transfer it along the actuator arm to a preamplifier which amplifies the signals coming from the heads.

A flex circuit provides an electrical pathway between the preamplifier of the actuator arm and a disc drive circuit board mounted on an opposite side of the base plate from the actuator and discs. The flex circuit also sends drive signals to the voice coil motor causing the actuator arm to pivot about the bearing assembly thereby changing the position of the head relative to the disc.

Electromagnetic fields induced within the voice coil motor and ground loops within the disc drive create electromagnetic interference ("EMI") noise within the disc drive. Although solutions for reducing the amount transmission within a disc drive of EMI noise originating outside of the disc drive are well known, there is a need to reduce the transmission of EMI noise originating within the disc drive itself. One path for the EMI noise to travel within the disc drive is along the actuator arm (E-block) which corrupts data being transmitted from the read/write head through the preamplifier and to the flex circuit. The corrupted data results in read errors to the disc drive circuit board.

One way to reduce the transmission of EMI noise along the actuator arm and flex circuit is to place conductive tape along the outside of the connection between the base plate and the cover along at least the entire side of the disc drive closest to the actuator assembly. The conductive tape provides an alternative pathway for EMI noise as opposed to traveling along the actuator arm of the disc drive. However, the use of conductive tape is time consuming and costly because the application of tape cannot be accomplished by machinery in the assembly line. Instead, the conductive tape must be manually placed on each disc drive. Additionally, the conductive tape itself is very costly.

It is thus desirable to provide an inexpensive alternative pathway for EMI noise to travel which will reduce the amount of EMI noise traveling along the actuator arm and flex circuit and reduce the amount of read errors in a disc drive. It is further desirable to provide an alternative pathway for EMI noise to travel which can be quickly and easily installed during the manufacturing process of the disc drive.

SUMMARY OF THE INVENTION

Against this backdrop the present invention has been developed. The present invention comprises an apparatus and method for reducing the transmission of electromagnetic interference ("EMI") noise originating within a disc drive in order to minimize read errors occurring within the disc drive.

A head disc assembly in a disc drive includes a base plate and a top cover enclosing a drive motor supporting one or more data storage discs thereon and an actuator assembly for transferring data to and from the disc. The actuator assembly includes a flex circuit which provides a path for data transfer between a read/write head and signal processing circuitry external to the head disc assembly.

The amount of EMI noise that reaches a portion of the flex circuit and causes read errors may be reduced by placing an electrically conductive grounding member positioned between a portion of the flex circuit and a source of EMI noise within the head disc assembly. The grounding member has an upper contact portion which electrically contacts the cover and a lower contact portion which electrically contacts the base plate and forms an alternative pathway, as opposed to along the actuator arm, for EMI noise to travel. By providing an alternative pathway, the amount of EMI noise received by at least a portion of the flex circuit is reduced which, in turn, reduces the amount of read errors in the disc drive. Further, the grounding member comprises a part which may be installed by robotic machinery in the disc drive manufacturing process, and may even be incorporated into an existing disc drive subcomponent thereby eliminating the cost of adding an additional part to the disc drive.

These and various other features as well as advantages which characterize the present invention will be apparent from a reading of the following detailed description and a review of the associated drawings.

DETAILED DESCRIPTION

Figure 1:
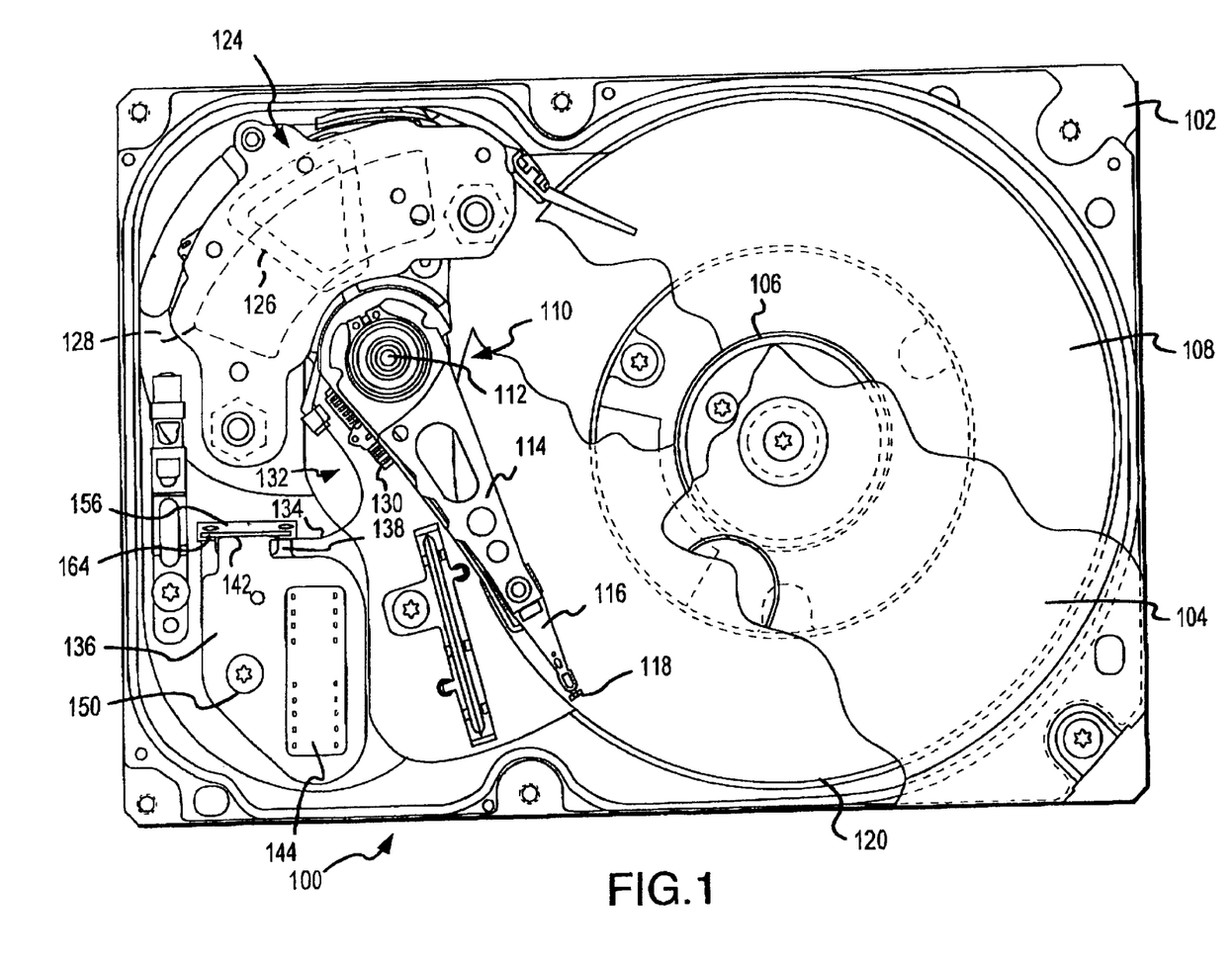
FIG. 1 is a plan view of a disc drive head disc assembly incorporating a grounding clip in accordance with one preferred embodiment of the invention with the head disc assembly cover partially broken away.

A disc drive 100 constructed in accordance with a preferred embodiment of the present invention is shown in FIG. 1. The disc drive 100 includes a metal base plate 102 to which various components of the disc drive 100 are mounted. A metal top cover 104 cooperates with the base plate 102 to form an internal, sealed environment for the disc drive in a conventional manner. The components include a drive motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 further includes an actuator arm 114, or E-block, which extend towards the discs 108, with one or more flexures 116 extending from the actuator arm 114. Mounted at the distal end of each of the flexures 116 is a read/write head 118 which includes an air bearing slider enabling the head 118 to fly in close proximity above the corresponding surface of the associated disc 108.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

Figure 2:
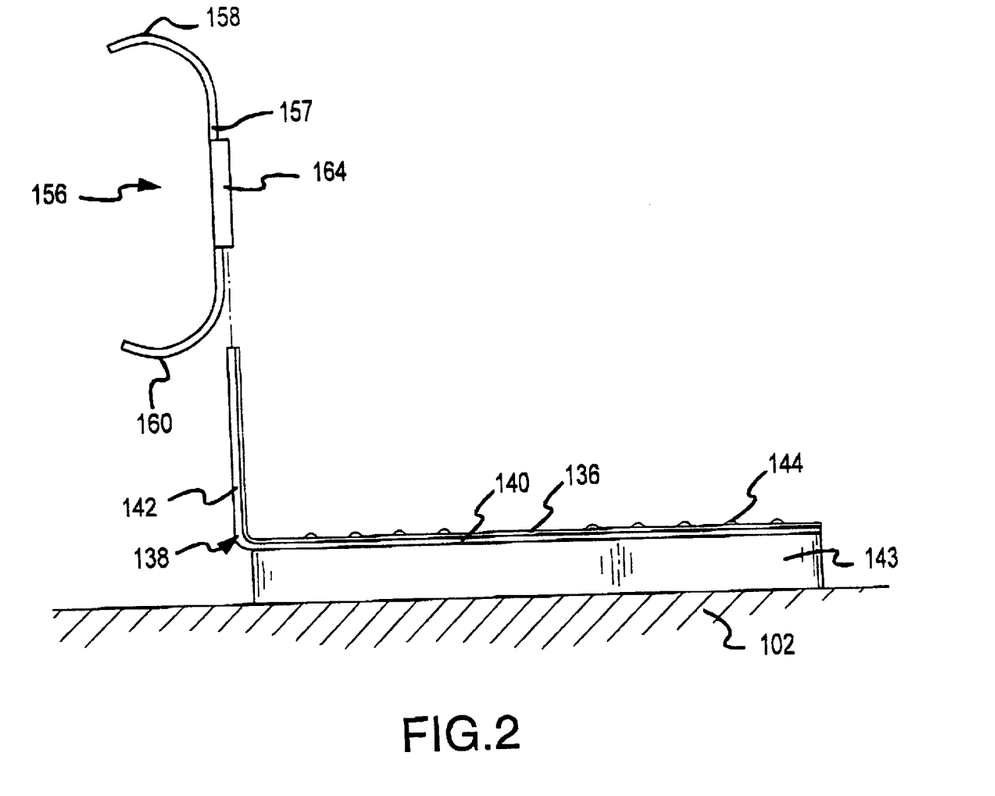
FIG. 2 illustrates an exploded side view of the grounding clip and flex circuit support bracket in accordance with the preferred embodiment of the invention.
Figure 3:
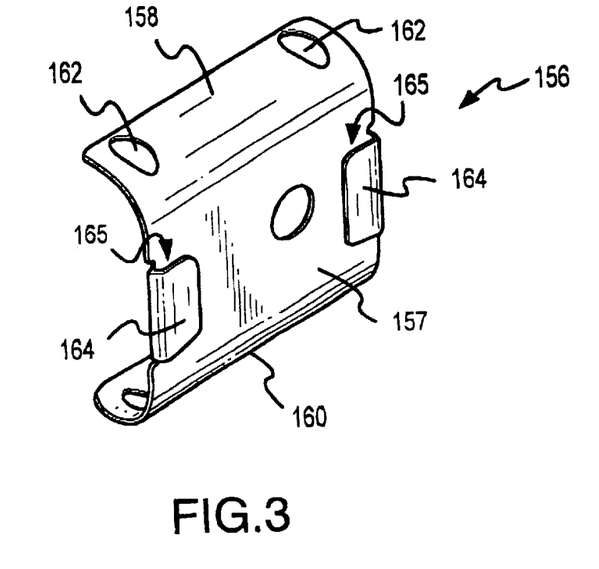
FIG. 3 shows a separate perspective view of the grounding clip depicted in FIG. 2.

A flex circuit 132 provides the requisite electrical connection paths for the actuator assembly 110 while allowing pivotal movement of the actuator assembly 110 during operation. The flex circuit includes a preamplifier 130, a flexible ribbon portion 134, and a fixed ribbon portion 136. Head wires or electrical traces (not shown) are connected from the heads 118 along the flexures 116 and routed along the actuator arm 114 to the preamplifier 130. The preamplifier 130 typically includes circuitry for controlling the write currents applied to the heads 118 during a write operation and for amplifying read signals generated by the heads 118 during a read operation. The flexible portion 134 of the flex circuit 132 connects the preamplifier 130 to the fixed portion 136 of the flex circuit 132. The fixed portion 136 of the flex circuit 132 is mounted to a flex circuit support bracket 138. The flex circuit support bracket 138 is in turn mounted to an insulating non-conductive support block 143 which is mounted to the base plate 102, as shown in FIG. 2. The fixed portion 136, the flex support bracket 138, and the block 143 are fastened to the base plate 102 with a flex bracket screw 150.

The flex support bracket 138 in the first embodiment of the invention is a flat piece of electrically conductive material, such as an inexpensive metal like aluminum or steel, which is bent into an L-shape with a long leg and short leg. The long leg forms a flex bracket base 140 and the short leg forms a flex bracket arm 142. The fixed portion 136 of the flex circuit 132 is fastened to the flex bracket base 140 which is, in turn, fastened to the block 143 in a parallel plane to the base plate 102 via screw 150. The flex bracket arm 142 extends upwards, preferably perpendicular to the plane of the base plate 102. The flex bracket base 140 electrically connects to a pass-through connector 144, which provides a passageway for the flex circuit 130 through the base plate 102 to a disc drive printed circuit board (not shown) mounted to an outer surface of the base plate 102.

As seen in FIGS. 2–5, a grounding clip 156 in accordance with this preferred embodiment of the present invention is installed on the flex bracket arm 142. The grounding clip 156 engages side edges 141 of the bracket arm 142 of the flex circuit support bracket 138. The grounding clip 156 is made of sheet metal bent into a C-shaped body having a straight mid portion 157, a curved upper end forming an upper contact portion 158 and a curved lower end forming a lower contact portion 160. The mid portion 157 of the grounding clip 156 has a pair of opposing tabs 164: the tabs 164 are folded over towards the outside of the curve of the C-shaped grounding clip 156. Each tab 164 forms an open slot 165 to receive an edge 141 of the flex bracket arm 142. The grounding clip 156 slides onto the flex bracket arm 142 such that the opposite edges 141 of the flex bracket arm 142 pass into open slots 165 of the grounding clip 156 positioning the grounding clip 156 in a generally upright orientation in the head disc assembly with lower contact portion 160 contacting the base plate 102. The grounding clip 156 may also include one or more ribs 162 on the upper and/or lower contact portions 158, 160 for facilitating and strengthening contact with base plate 102 and/or the cover 104.

Figure 4:
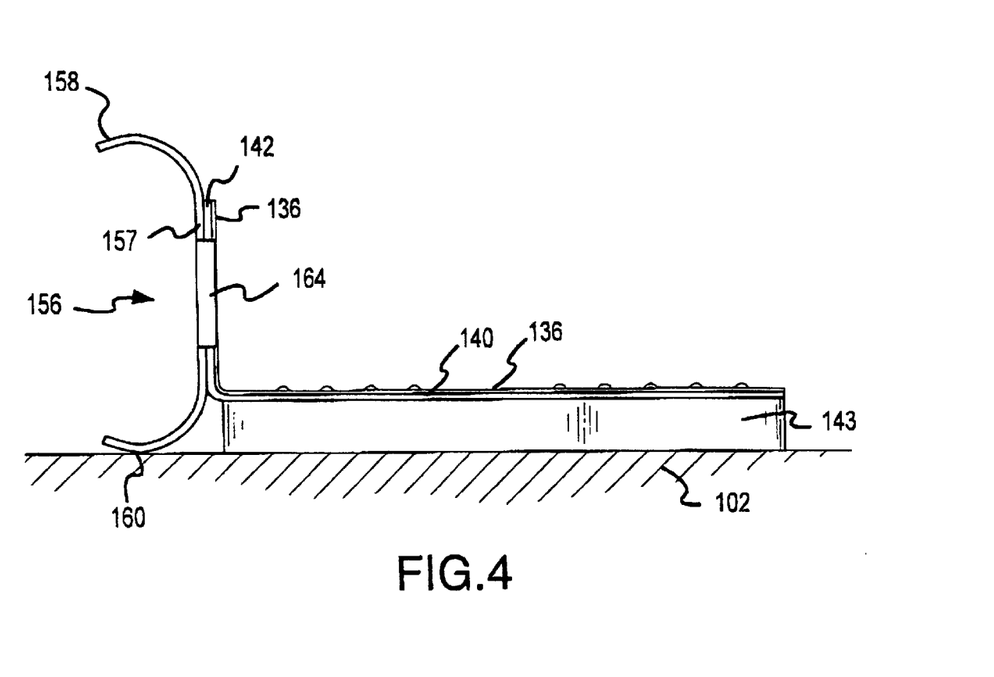
FIG. 4 is a side view of the grounding clip in accordance with the preferred embodiment of the present invention shown in FIG. 1 connected to the flex circuit support bracket with the cover removed from the disc drive.
Figure 5:
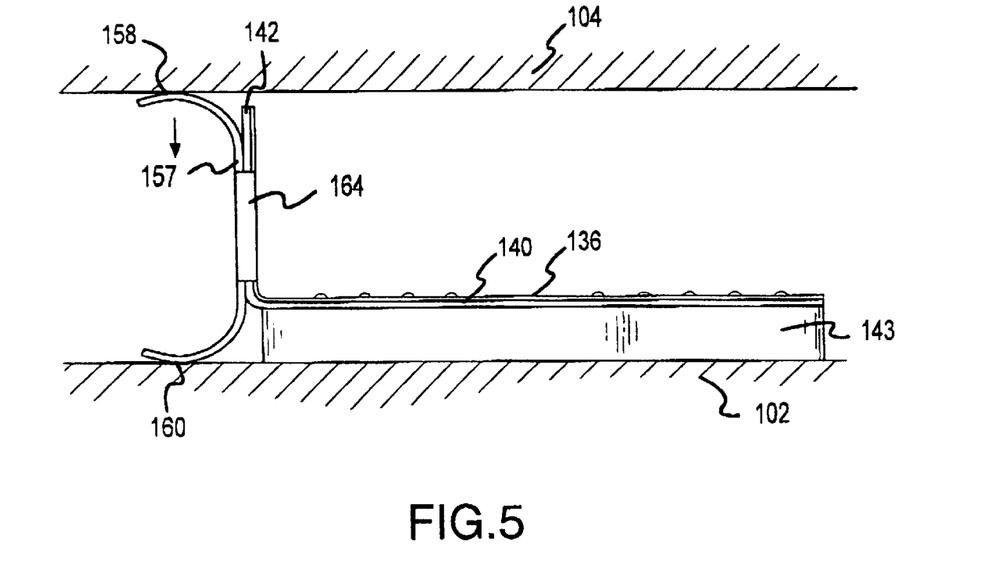
FIG. 5 is a side view of the grounding clip in accordance with the preferred embodiment of the present invention shown in FIG. 1 connected to the flex circuit support bracket with the cover attached to the base plate of the disc drive.

When the cover 104 is removed from the disc drive 100, the grounding clip 156 may be slid onto the flex circuit support bracket 138, as illustrated in FIGS. 2 and 4, by hand or with typical machinery used in the disc drive manufacturing process. While the cover 104 is removed, the lower contact portion 160 may or may not contact the base plate 102. When the cover 104 is attached to the base plate 102, as is shown in FIG. 5, the cover 104 makes contact with the upper contact portion 158 of the grounding clip 156. Fastening the cover 104 and the base plate 102 together compresses the grounding clip 156 in a downward direction as shown by the arrows in FIG. 5. If the lower contact portion 160 was not touching the base plate 102 before, the downward compression will slide the grounding clip 156 down on the bracket arm 142 and will cause the lower contact portion 160 to firmly contact the base plate 102. If there was contact between the lower contact portion 160 and the base plate 102 prior to cover installation, the downward compression will firmly strengthen the grounding contact between the lower contact portion 160 and the base plate 102. In this way, grounding contact is firmly made between the cover 104 and the base plate 102. This grounding contact between the cover 104 and the base plate 102 provides an alternative pathway for EMI noise, as opposed to following, for example, the path along the actuator arm 114, and reduces the amount of noise transmitted from the head 118 to the external disc drive circuit board thereby reducing the potential number of read errors.

Figure 6:
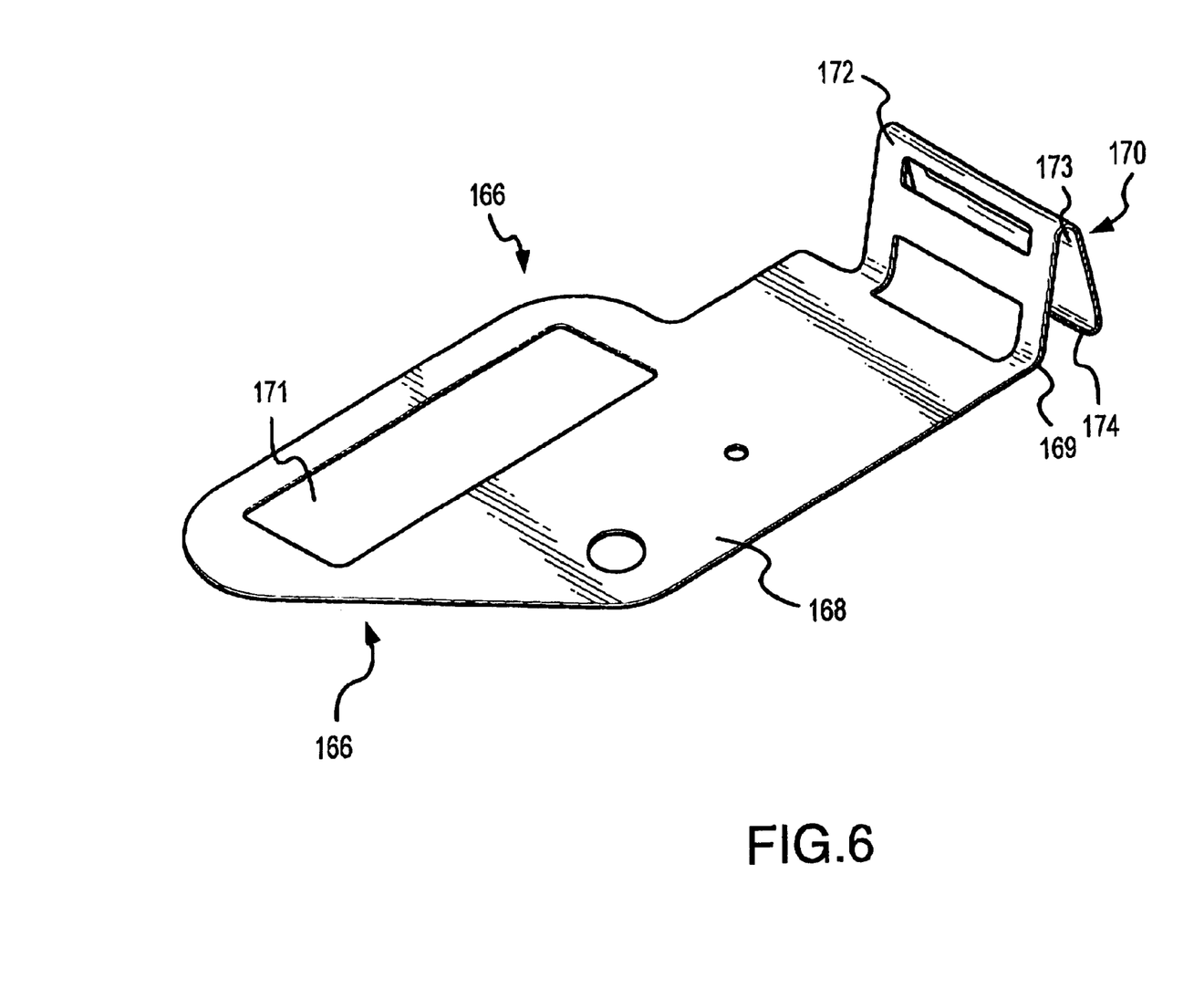
FIG. 6 is a perspective view of a grounding bracket in accordance with another preferred embodiment of the present invention.
Figure 7:
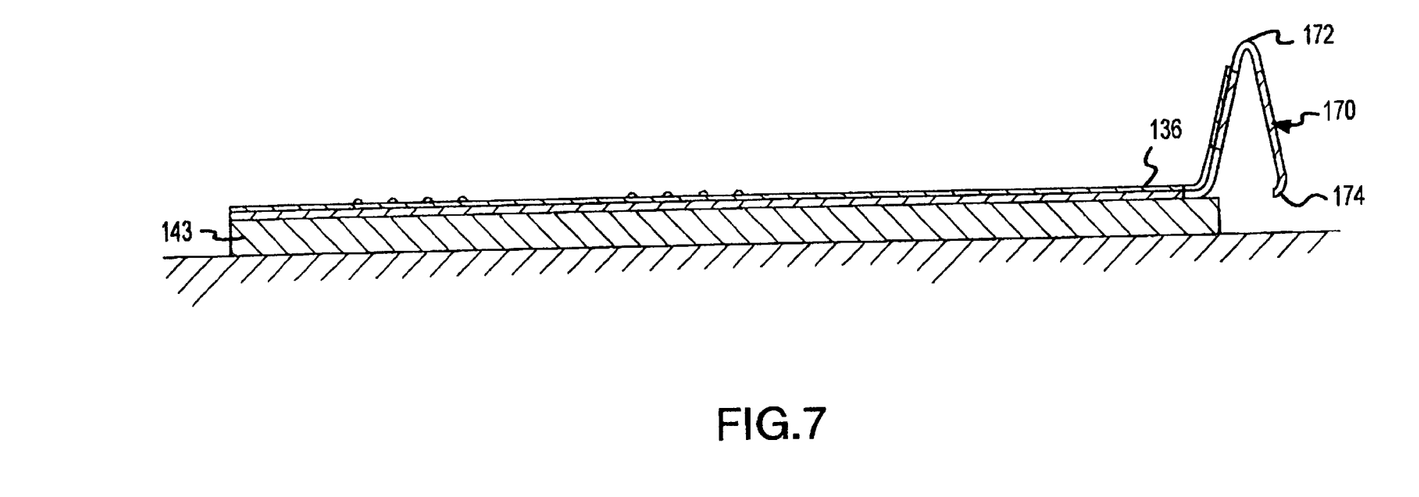
FIG. 7 is a side view of the grounding bracket of FIG. 6 installed in a disc drive with the cover removed from the disc drive.
Figure 8:
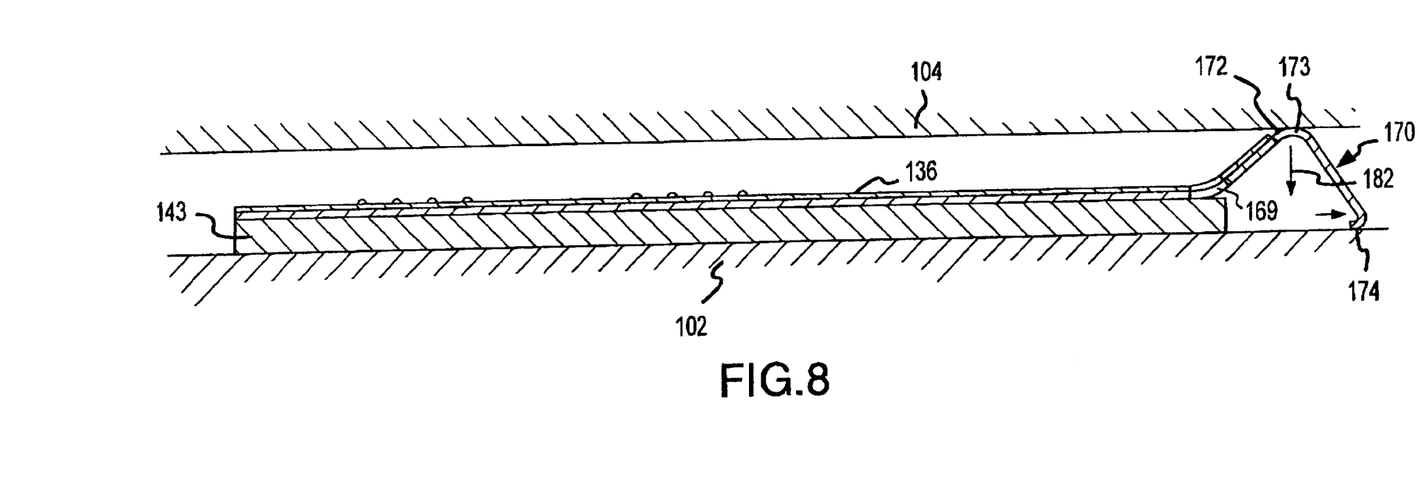
FIG. 8 is a side view of the grounding bracket of FIG. 7 with the cover attached to the base plate of the disc drive.

Another preferred embodiment of the invention is shown in FIGS. 6–8. The flex circuit support bracket 138 in the first embodiment described above is structurally modified to incorporate a grounding member referred to in this embodiment as a grounding flex circuit support bracket 166. This embodiment has the additional benefit that it does not require an additional part and is thus less expensive and less time consuming to install during the manufacturing process.

The grounding bracket 166 is made of an elongated a flat sheet of conductive material, such as spring steel or beryllium copper, which is cut and bent to form a flat bracket base 168 having a pair spaced bends 169 and 173 at one end. These bends form a V-shaped bracket arm 170 at the one end of the grounding bracket 166. The first bend 169 forms an upright portion of the bracket arm 170 from the bracket base 168 while the second bend 173 forms an upper contact portion 172 of the bracket arm 170. The terminal end of the bracket arm 170 forms a lower contact portion 174. The fixed portion 136 of the flex circuit 132 is mounted to the bracket base 168 which is mounted to the block 143 which is mounted to the base plate 102 with a flex bracket screw 150 similar to the flex circuit support bracket 138 in FIG. 1. The grounding bracket base 168 further includes an aperture 171 for receiving a pass-through connector 144 also shown in FIG. 1. As in the first embodiment, the bracket arm 170 reduces the transmission of EMI noise to the flex circuit 132.

As illustrated in FIG. 7, the grounding bracket arm 170 is biased to a raised position and the lower contact portion 174 does not touch the base plate 102 when the cover 104 is not installed on the base plate 102. However, when the cover 104 is placed on the base plate 102 to enclose the disc drive components during attachment to the base plate 102, the cover 104 first makes contact with upper contact portion 172 of the grounding bracket arm 170 and then compresses the bracket arm 170 in a downward direction shown by the arrows 180 and 182 in FIG. 8. When the cover 104 is fastened to the base plate 102, the cover 104 will have compressed the grounding bracket arm 170 to the point that the lower contact portion 174 makes contact with and scrapes and slides along the base plate 102. In this way, the grounding bracket 166 provides a solid grounded connection between the cover 104 and the base plate 102 which creates an alternative pathway for EMI noise as opposed to traveling along the actuator arm 114.

Figure 9:
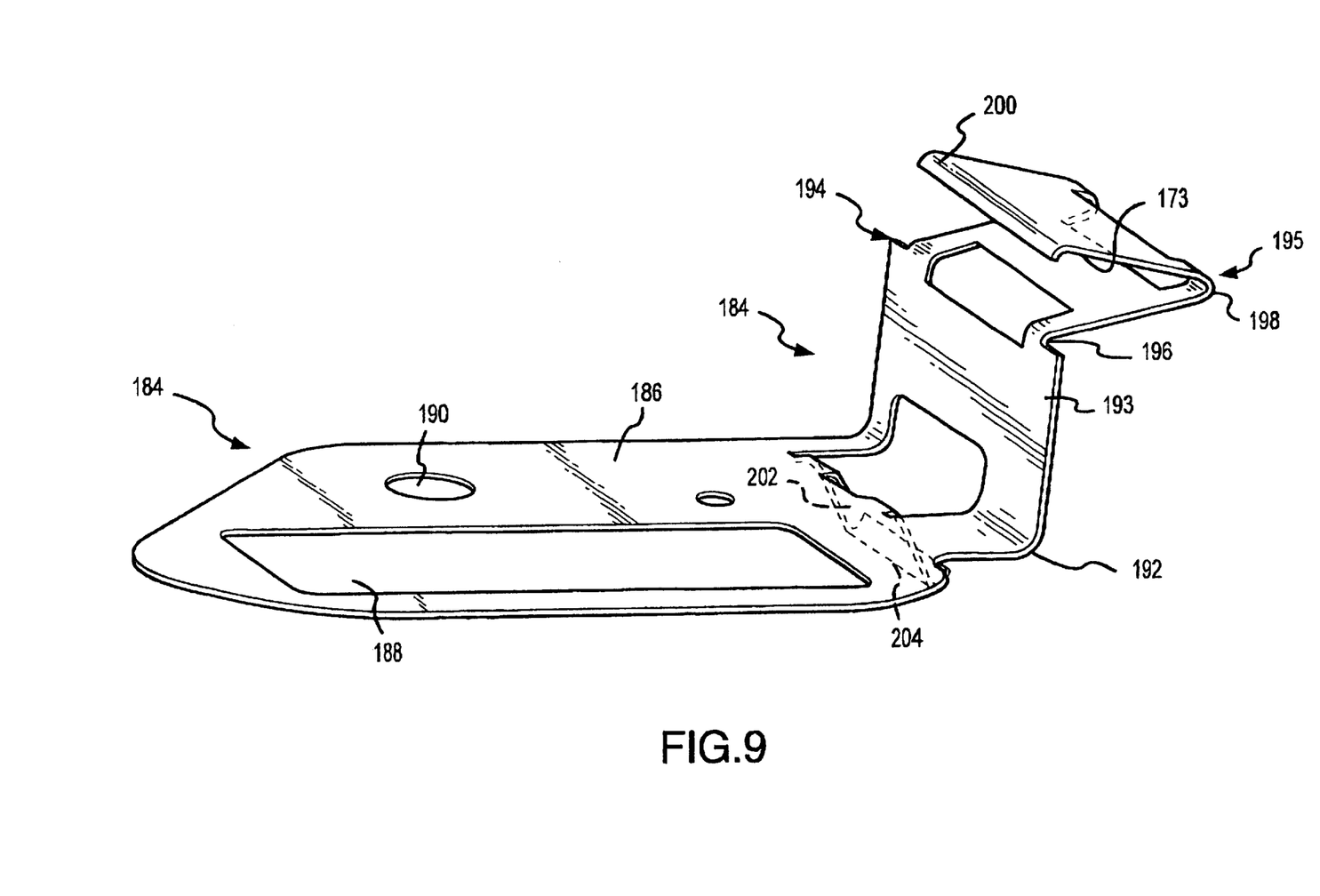
FIG. 9 is a perspective view of a grounding bracket in accordance with an alternate preferred embodiment of the present invention.
Figure 10:
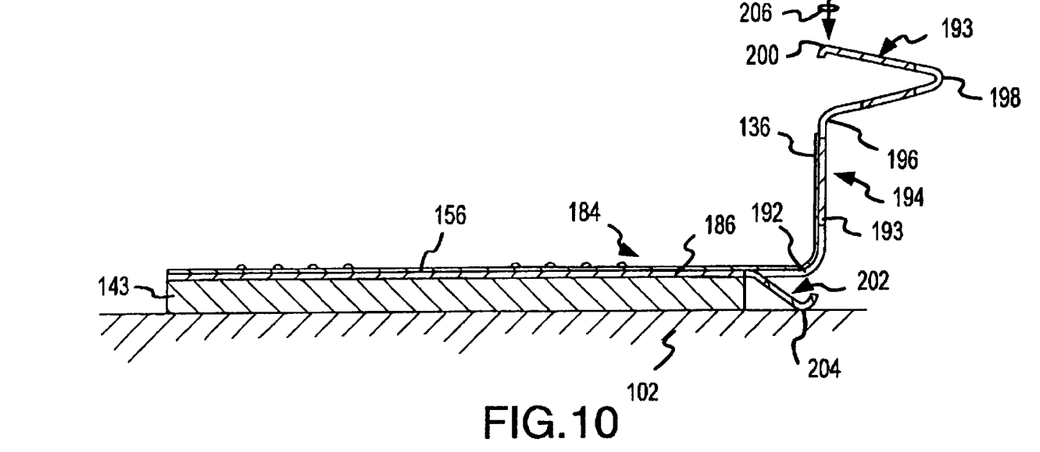
FIG. 10 is a side view of the grounding bracket of FIG. 9 installed in a disc drive with the cover removed from the disc drive.
Figure 11:
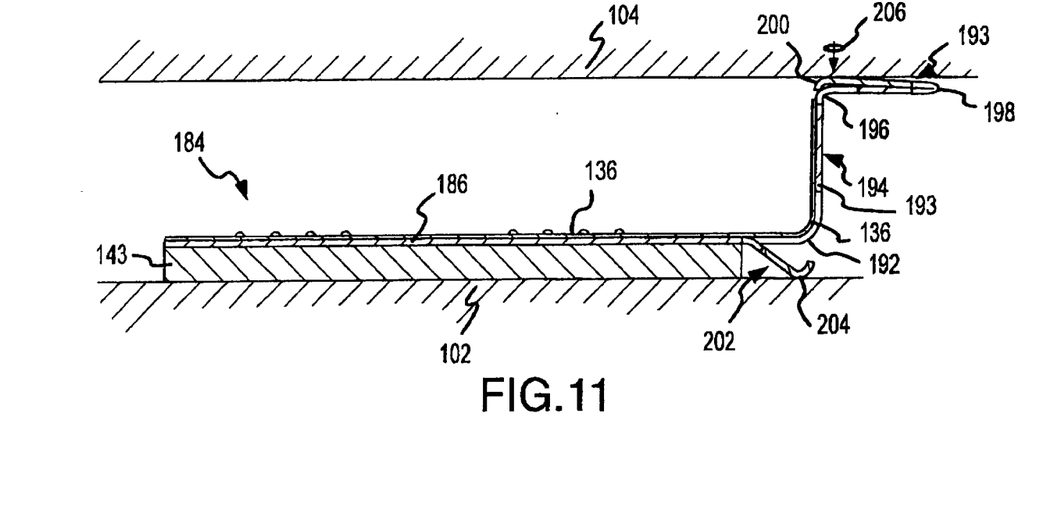
FIG. 11 is a side view of the grounding bracket of FIG. 10 with the cover attached to the base plate of the disc drive.

An alternative preferred embodiment of the invention is shown in FIGS. 9–11. As in the previous embodiment, the flex circuit support bracket 138 of the first embodiment described above is again structurally modified to incorporate a grounding member referred to as a grounding flex circuit support bracket 184 having an upper and lower contact member. Like the previous embodiment, this embodiment hag the additional benefit that it does not require an additional part and is thus less expensive and less time consuming to install during the manufacturing process.

As shown in FIG. 9, the grounding bracket 184 is made of an elongated a flat sheet of conductive material, such as spring steel or beryllium copper, which is cut and bent to form a 5 flat bracket base 186 having a three spaced bends 192, 196, and 198 at one end. The bends 192, 196, and 198 form a first bracket arm 194 with a V-shaped contact member 195 at the one end of the first bracket arm 194. The first bend 192 forms an upright portion 193 of the first bracket arm 194 from the bracket base 186 while the second and third bends 196 and 198 form the V-shaped contact member 195 of the first bracket arm 194. A terminal end of the V-shaped contact member 195 forms an upper contact portion 200.

As shown in FIG. 10, the fixed portion 136 of the flex circuit 132 is mounted to the bracket base 184 which is mounted to the block 143 which is, in turn, mounted to the base plate 102 with a flex bracket screw (not shown) through an aperture 190, shown in FIG. 9, similar to the flex circuit support bracket 138 in FIG. 1. The grounding bracket base 186 further includes an aperture 188 for receiving a pass-through connector 144 also shown in FIG. 1.

The grounding bracket 184 further includes a second bracket arm 202 formed out of the flat bracket base 186 adjacent to the first bend 192. The second bracket arm 202 is folded downwards in the shape of a hooked tab to form a lower contact portion 204. During the manufacture of disc drive 100, as the grounding bracket 184 is fastened to block 143 and base plate 102, the lower contact portion 204 of the second bracket arm 202 makes contact with base plate 102, as shown in FIG. 10.

As illustrated in FIG. 10, the V-shaped contact member 195 of the first grounding bracket arm 194 is biased to a raised position when the cover 104 is not installed on the base plate 102. However, when the cover 104 is placed on the base plate 102 to enclose the disc drive components during attachment to the base plate 102, the cover 104 first makes contact with upper contact portion 200 of the V-shaped contact member 195 and then compresses the V-shaped contact member 195 in a downward direction shown by the arrow 206 in FIGS. 10 and 11. When the cover 104 is fastened to the base plate 102, the cover 104 will have compressed the V-shaped contact member 195 to the point that a surface of the upper contact portion 200 opposite of the cover 104 makes contact with the second bend 196 of the first bracket arm 194. In this way, the grounding bracket 184 provides a solid grounded connection between the cover 104 and the base plate 102 which creates an alternative pathway for EMI noise as opposed to traveling along the actuator arm 114.

Figure 12:
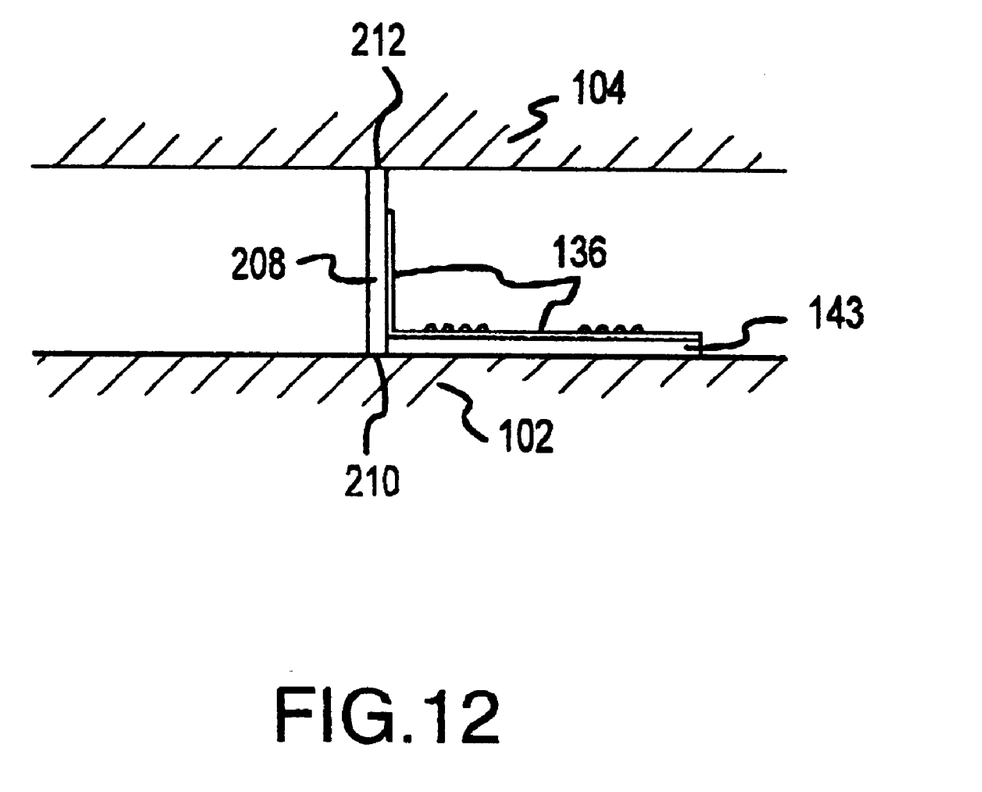
FIG. 12 is a schematic side view of another preferred grounding bracket in accordance with the invention.

Finally, an alternative preferred embodiment of the present invention is shown in FIG. 12. As opposed to using a support bracket, such as bracket 138, to support the flex circuit 132, a grounding support wall 208 and the block 143 support the fixed portion 136 of the flex circuit 132.

The grounding support wall 208 has two opposite ends 210 and 212. The grounding support wall 208 is cast in the base plate 102 such that one end 210 is integral with the base plate 102 and forms a lower contact portion 210. During the manufacturing process, the end opposite of lower contact portion 210 is machined off forming upper contact portion 212 which makes contact with the cover 104 when the cover 104 is attached to the base plate 102. In this way, grounding contact is made between the cover 104 and the base plate 102 thereby providing an alternate pathway for EMI noise and reducing read errors within the disc drive 100.

In summary, the present invention preferably is an apparatus for reducing transmission of electromagnetic interference ("EMI") noise originating within a head disc assembly in a disc drive (such as 100). The head disc assembly has a base plate (such as 102) and a top cover (such as 104) which encloses the following disc drive components: a drive motor (such as 106) which supports one or more data storage discs (such as 108) thereon, an actuator assembly (such as 110) for transferring data to and from the disc (such as 108) via an actuator arm (such as 114), and a flex circuit (such as 132) which provides a path for data transfer between the disc (such as 108) and circuitry external to the head disc assembly.

The apparatus is an electrically conductive grounding member (such as 156, 166, 184, or 208) positioned between a portion (such as 136) of the flex circuit (such as 132) and a source of EMI noise in the head disc assembly. The grounding member (such as 156, 166, 184, or 208) has an upper contact portion (such as 158, 172, 200, or 212) which electrically contacts the top cover (such as 104) and a lower contact portion (such as 160, 174, 204, or 210) which electrically contacts the base plate (such as 102) to reduce the amount of EMI noise received by the flex circuit (such as 132).

In one embodiment of the present invention, the grounding member (such as 156) is a flat piece of conductive material formed into a C-Shaped body and has a straight mid portion (such as 157) which joins a curved upper end acting as the upper contact portion (such as 158) and a curved lower end acting as the lower contact portion (such as 160). At least a portion (such as 136) of the flex circuit (such as 132) is mounted to a flex circuit support bracket (such as 138) which is attached to the base plate (such as 102) and the grounding member (such as 156) is attached to the flex circuit support bracket (such as 138). The flex circuit support bracket (such as 138) is a flat piece of electrically conductive material which has a bend forming a long leg and a short leg, the long leg forms a bracket base (such as 140) attached to the base plate (such as 102) and the short leg (such as 142) is positioned generally perpendicular to the plane of the base plate (such as 102). The mid portion (such as 157) of the grounding member (such as 156) has two opposing tabs (such as 164) adapted to engage the short leg (such as 142) of the support bracket (such as 138).

In another embodiment of the present invention, the grounding member (such as 166 or 184) includes a grounding bracket (such as 166 or 184) which supports at least a portion (such as 136) of the flex circuit (such as 132). The grounding bracket (such as 166 or 184) is a flat piece of conductive material which has a straight portion (such as 168 or 186) and a pair of spaced bends (such as 169 and 173) or three spaced bends (such as 192, 196, or 198) at one end. One of the bends (such as 169) forms a first V-shaped contact member (such as 170) with the other bend (such as 173) forming the upper contact portion (such as 172) and a lower edge forming the lower contact portion (such as 174). The upper and lower contact portions (such as 172 and 174) engage the cover (such as 104) and the base plate (such as 102) when the cover (such as 104) is fastened to the base plate (such as 102).

In yet another embodiment of the present invention, the grounding member (such as 184) includes a grounding bracket (such as 184) which supports at least a portion (such as 136) of the flex circuit (such as 132). The grounding bracket (such as 184) is a flat piece of conductive material which has a straight portion (such as 186) and three spaced bends (such as 192, 196, and 198) at one end. One of the bends (such as 192) forms a first bracket arm 194 with the other two bends (such as 196 and 198) form a V-shaped contact member (such as 195) having the upper contact portion (such as 200) thereon. The grounding bracket (such as 184) includes a second bracket arm (such as 202) formed from the straight portion (such as 186) forms the lower contact portion (such as 204). The upper contact portion (such as 200) and lower contact portion (such as 204) engage the cover (such as 104) and the base plate (such as 102) when the cover (such as 104) is fastened to the base plate (such as 102).

A method for reducing the amount of EMI noise transmitted to a flex circuit (such as 132) in a head disc assembly of a disc drive (such as 100) is as follows. The grounding member (such as 156, 166, 184, or 208) is placed between a portion (such as 136) of the flex circuit (such as 132) and at least a portion of an EMI noise generating source. The electrically conductive cover (such as 104) is then placed on the base plate (such as 102) to enclose the actuator assembly (such as 110), the disc (such as 108), and the drive motor (such as 106) within the head disc assembly. Finally, the grounding member (such as 156, 166, 184, or 208) is compressed between the cover (such as 104) and the base plate (such as 102) by fastening the base plate (such as 102) and the cover (such as 104) together such that the upper contact portion (such as 158, 172, 200, or 212) of the grounding member (such as 156, 166, 184, or 208) contacts the cover (such as 104) and the lower contact portion (such as 160, 174, 204, or 210) contacts the base plate (such as 102) forming a metal-to-metal contact between the base plate (such as 102) and the cover (such as 104) to reduce the amount of transmission of EMI noise to the flex circuit (such as 132).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art. Accordingly, all such modifications, changes and alternatives are encompassed in the spirit of the invention disclosed and as defined in the appended claims.

What is claimed is:

1. An apparatus for reducing transmission of electromagnetic interference ("EMI") noise originating within a head disc assembly in a disc drive, the head disc assembly having a base plate and a top cover enclosing a drive motor supporting a data storage disc thereon and an actuator assembly for transferring data to and from the disc, the actuator assembly including a flex circuit providing a path for data transfer between the disc and circuitry external to the head disc assembly; the apparatus comprising:

an electrically conductive grounding member positioned between a portion of the flex circuit and a source of EMI noise in the head disc assembly, the grounding member comprising a flat piece of conductive material formed into a C-shaped body having a straight mid portion joining a curved upper contact portion electrically contacting the top cover and a curved lower contact portion electrically contacting the base plate to reduce the amount of EMI noise received by the flex circuit.

2. The apparatus of claim 1 wherein:
a portion of the flex circuit is mounted to a flex circuit support bracket attached to the base plate; and
the grounding member is attached to the flex circuit support bracket.

3. The apparatus of claim 2 wherein:
the flex circuit support bracket comprises a flat piece of electrically conductive material having a bend forming a long leg and a short leg, the long leg forming a bracket base attached to the base plate with the short leg positioned generally perpendicular to the plane of the base plate.

4. The apparatus of claim 3 wherein the mid portion of the grounding member has two opposing tabs adapted to engage the short leg of the support bracket.

5. A disc drive comprising:
a head disc assembly having a base plate and a cover enclosing a drive motor supporting at least one data storage disc thereon and an actuator assembly for transferring data to and from the disc, the actuator assembly including a flex circuit providing a path for data transfer between the disc and circuitry external to the head disc assembly; and
electrically conductive grounding means positioned in the head disc assembly between a portion of the flex circuit and a source of EMI noise in the head disc assembly for reducing the amount of EMI noise received by the portion of the flex circuit.

6. A disc drive comprising:
a head disc assembly having a base plate and a top cover enclosing a drive motor supporting a data storage disc thereon and an actuator assembly for transferring data to and from the disc, the actuator assembly including a flex circuit providing a path for data transfer between the disc and circuitry external to the head disc assembly;
a flex circuit support bracket mounted to the base plate having a bracket base extending parallel to a plane of the base plate and a bracket arm extending upward from the plane of the base plate; and
an electrically conductive grounding member fastened to the bracket arm of the flex circuit support bracket, the grounding member having an upper contact portion electrically contacting the top cover and a lower contact portion electrically contacting the base plate to reduce electromagnetic interference noise received by the flex circuit.

7. The disc drive according to claim 6 wherein the grounding member is slideably secured to the bracket arm.

8. The disc drive according to claim 7 wherein the grounding member includes two opposing tabs defining a slot for receiving the bracket arm.

9. The disc drive according to claim 8 wherein the grounding member is formed as a C-shaped body having a substantially straight mid portion supporting the opposing tabs.

10. The disc drive according to claim 9 wherein the grounding member is compressed between the top cover and the base plate to provide firm grounding contact between the top cover and the base plate.

11. A disc drive comprising:
a head disc assembly having a base plate and a top cover enclosing a drive motor supporting a data storage disc thereon and an actuator assembly for transferring data to and from the disc, the actuator assembly including a flex circuit providing a path for data transfer between the disc and circuitry external to the head disc assembly;
a flex circuit support bracket mounted to the base plate and having a bracket base extending parallel to a plane of the base plate; and
an electrically conductive grounding member formed integrally with the flex circuit support bracket, the grounding member having an upper contact portion electrically contacting the top cover and a lower contact portion electrically contacting the base plate to reduce electromagnetic interference noise received by the flex circuit.

12. The disc drive according to claim 11 wherein the grounding member includes:
a first bracket arm formed integrally with the bracket base and extending upward from one end of the bracket base, the first bracket arm having a V-shaped contact member at one end extending above the bracket base, wherein a terminal end of the V-shaped contact member forms the upper contact portion; and
a second bracket arm formed integrally with the bracket base and extending downward from the bracket base to form the lower contact portion.

13. The disc drive according to claim 12 wherein the V-shaped contact member is compressed when the top cover is fastened to the base plate so that the terminal end of the V-shaped contact member engages the one end of the first bracket arm.

14. The disc drive according to claim 11 wherein the grounding member includes a V-shaped bracket arm formed integrally with the bracket base, the V-shaped bracket arm including a bend section extending upward from one end of the bracket base to form the upper contact portion, wherein the V-shaped bracket arm further includes a terminal portion extending downward from the bend section to form the lower contact portion.

15. The disc drive according to claim 14 wherein:
the V-shaped bracket arm is biased upward so that the lower contact portion does not engage the base plate before the top cover is installed on the base plate; and
the V-shaped bracket arm is compressed downward by contact between the top cover and the bend section so that the lower contact portion engages the base plate after the top cover is installed on the base plate.

16. A disc drive comprising:
a head disc assembly having a base plate and a top cover enclosing a drive motor supporting a data storage disc thereon and an actuator assembly for transferring data to and from the disc, the actuator assembly rotating about a bearing assembly and including a head to read and write data to the disc, the actuator assembly further including a preamplifier attached to rotate with the actuator assembly, the head disc assembly further including a flex circuit providing a path for data transfer between the preamplifier and circuitry external to the head disc assembly;
a flex circuit support bracket mounted to the base plate separately from the actuator assembly; and
an electrically conductive grounding member secured to one end of the flex circuit support bracket and positioned substantially between the flex circuit support bracket and the preamplifier, the grounding member having an upper contact portion electrically contacting the top cover and a lower contact portion electrically contacting the base plate to reduce electromagnetic interference noise received by the flex circuit.

* * * * *